United States Patent
Lee et al.

(10) Patent No.: US 10,793,112 B2
(45) Date of Patent: *Oct. 6, 2020

(54) STEERING WHEEL AND VEHICLE CONTROL SYSTEM INCLUDING THE SAME

(71) Applicant: SAMSUNG DISPLAY CO., LTD., Yongin-si, Gyeonggi-do (KR)

(72) Inventors: Tae Hee Lee, Yongin-si (KR); Won Ki Hong, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 351 days.

This patent is subject to a terminal disclaimer.

(21) Appl. No.: 15/801,796

(22) Filed: Nov. 2, 2017

(65) Prior Publication Data

US 2018/0178760 A1   Jun. 28, 2018

(30) Foreign Application Priority Data

Dec. 23, 2016   (KR) .................. 10-2016-0178007

(51) Int. Cl.
*B60R 25/25* (2013.01)
*B62D 1/04* (2006.01)
*B60R 25/0215* (2013.01)
*B62D 1/06* (2006.01)

(52) U.S. Cl.
CPC ........ *B60R 25/252* (2013.01); *B60R 25/0215* (2013.01); *B62D 1/04* (2013.01); *B62D 1/046* (2013.01); *B62D 1/06* (2013.01)

(58) Field of Classification Search
CPC ..... B60R 25/252; B60R 25/0215; B62D 1/04; B62D 1/046; B62D 1/06
See application file for complete search history.

(56) References Cited

U.S. PATENT DOCUMENTS

| | | | |
|---|---|---|---|
| 6,100,811 A | 8/2000 | Hsu et al. | |
| 6,927,671 B2* | 8/2005 | DeBono | B60R 25/066 180/287 |
| 7,347,298 B2 | 3/2008 | Perry | |
| 8,289,285 B2* | 10/2012 | Jang | G02F 1/13338 345/173 |
| 8,333,128 B2 | 12/2012 | Schober et al. | |
| 8,564,424 B2 | 10/2013 | Evarts et al. | |
| 8,805,028 B2 | 8/2014 | Miura et al. | |
| 9,410,615 B2 | 8/2016 | Lindner et al. | |
| 9,593,765 B2 | 3/2017 | Kim et al. | |
| 9,916,793 B2* | 3/2018 | Kozuma | G09G 3/34 |
| 9,933,068 B2 | 4/2018 | Kim | |
| 10,049,253 B2 | 8/2018 | Yang et al. | |
| 10,452,889 B2 | 10/2019 | Wu et al. | |

(Continued)

FOREIGN PATENT DOCUMENTS

| CN | 1932845 A | 3/2007 |
|---|---|---|
| CN | 101730807 A | 6/2010 |

(Continued)

*Primary Examiner* — Thomas E Worden
(74) *Attorney, Agent, or Firm* — Cantor Colburn LLP

(57) ABSTRACT

A steering wheel includes a wheel frame, and a cover layer covering the wheel frame. The cover layer includes a touch sensor which generates touch information based on a touch of a user, and the touch sensor includes a plurality of sensor pixels which senses a capacitance change corresponding to the touch.

20 Claims, 8 Drawing Sheets

(56) References Cited

U.S. PATENT DOCUMENTS

| | | | |
|---|---|---|---|
| 2004/0041689 A1* | 3/2004 | DeBono | B60R 25/066 340/5.52 |
| 2008/0030301 A1 | 2/2008 | Terao | |
| 2008/0069412 A1 | 3/2008 | Champagne et al. | |
| 2010/0253638 A1* | 10/2010 | Yousefpor | G06F 3/0412 345/173 |
| 2011/0242075 A1* | 10/2011 | Yamamoto | G06F 3/0412 345/207 |
| 2012/0242621 A1* | 9/2012 | Brown | H01L 27/14641 345/175 |
| 2016/0078268 A1 | 3/2016 | Mankowski et al. | |
| 2016/0216823 A1 | 7/2016 | Setlak | |
| 2016/0274699 A1* | 9/2016 | Shishido | G02F 1/1333 |
| 2016/0282990 A1* | 9/2016 | Kimura | G02F 1/13338 |
| 2016/0304091 A1* | 10/2016 | Remes | B60K 35/00 |
| 2016/0350577 A1 | 12/2016 | Yang et al. | |
| 2018/0032783 A1 | 2/2018 | Wu et al. | |
| 2018/0046004 A1* | 2/2018 | Yamazaki | G02F 1/136213 |
| 2018/0081478 A1* | 3/2018 | Hong | G06F 3/0414 |
| 2018/0082099 A1 | 3/2018 | Abe | |
| 2018/0113547 A1* | 4/2018 | Miyake | G06F 3/0412 |
| 2018/0150163 A1 | 5/2018 | Lee et al. | |
| 2018/0151656 A1* | 5/2018 | Choo | H01L 27/3213 |
| 2018/0152185 A1* | 5/2018 | Kawahata | B62D 1/046 |
| 2018/0172145 A1 | 6/2018 | Farges et al. | |
| 2018/0180169 A1* | 6/2018 | Lee | F16H 59/0278 |
| 2018/0196988 A1 | 7/2018 | Tse | |
| 2018/0239432 A1* | 8/2018 | Hwang | G06F 3/04886 |
| 2019/0227652 A1* | 7/2019 | Kwon | G06F 3/044 |
| 2019/0248402 A1* | 8/2019 | Trachte | B62D 1/046 |

FOREIGN PATENT DOCUMENTS

| | | |
|---|---|---|
| CN | 103782068 A | 5/2014 |
| CN | 104121357 A | 10/2014 |
| CN | 204061845 U | 12/2014 |
| CN | 105094443 A | 11/2015 |
| CN | 105981040 A | 9/2016 |
| KR | 200331124 Y1 | 10/2003 |
| KR | 1020150004544 A | 1/2015 |
| KR | 101588972 B1 | 1/2016 |

\* cited by examiner

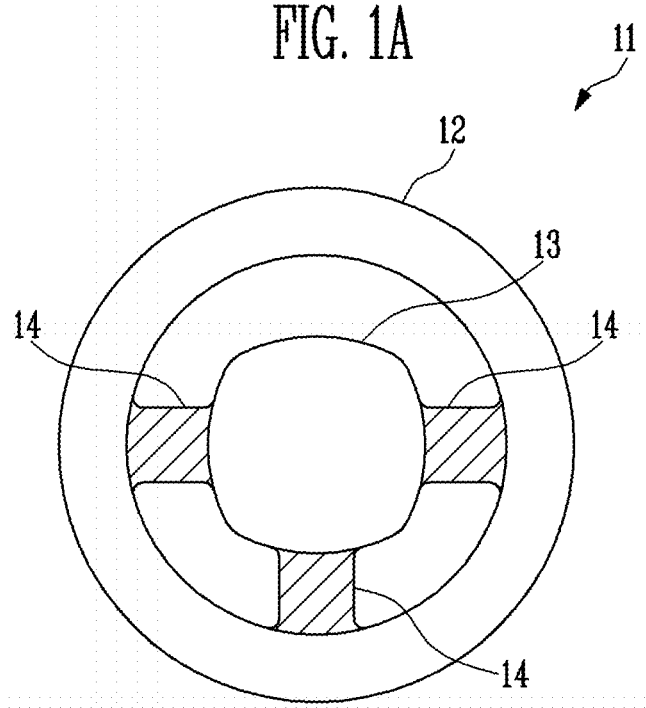
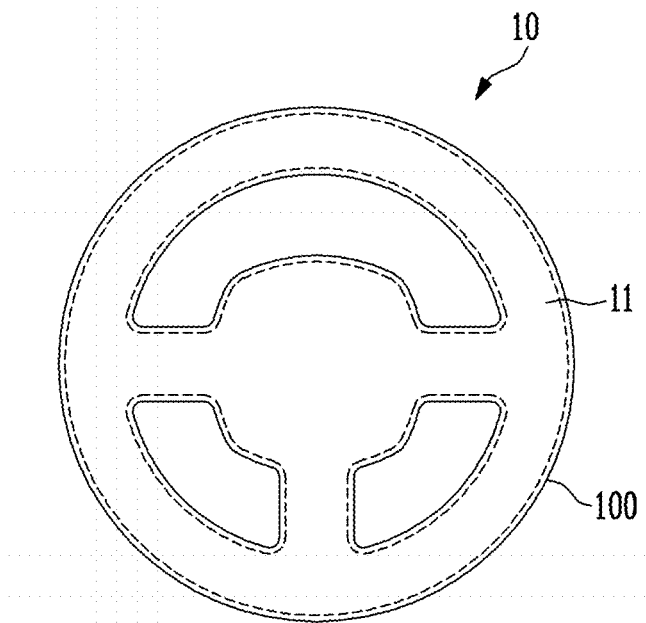

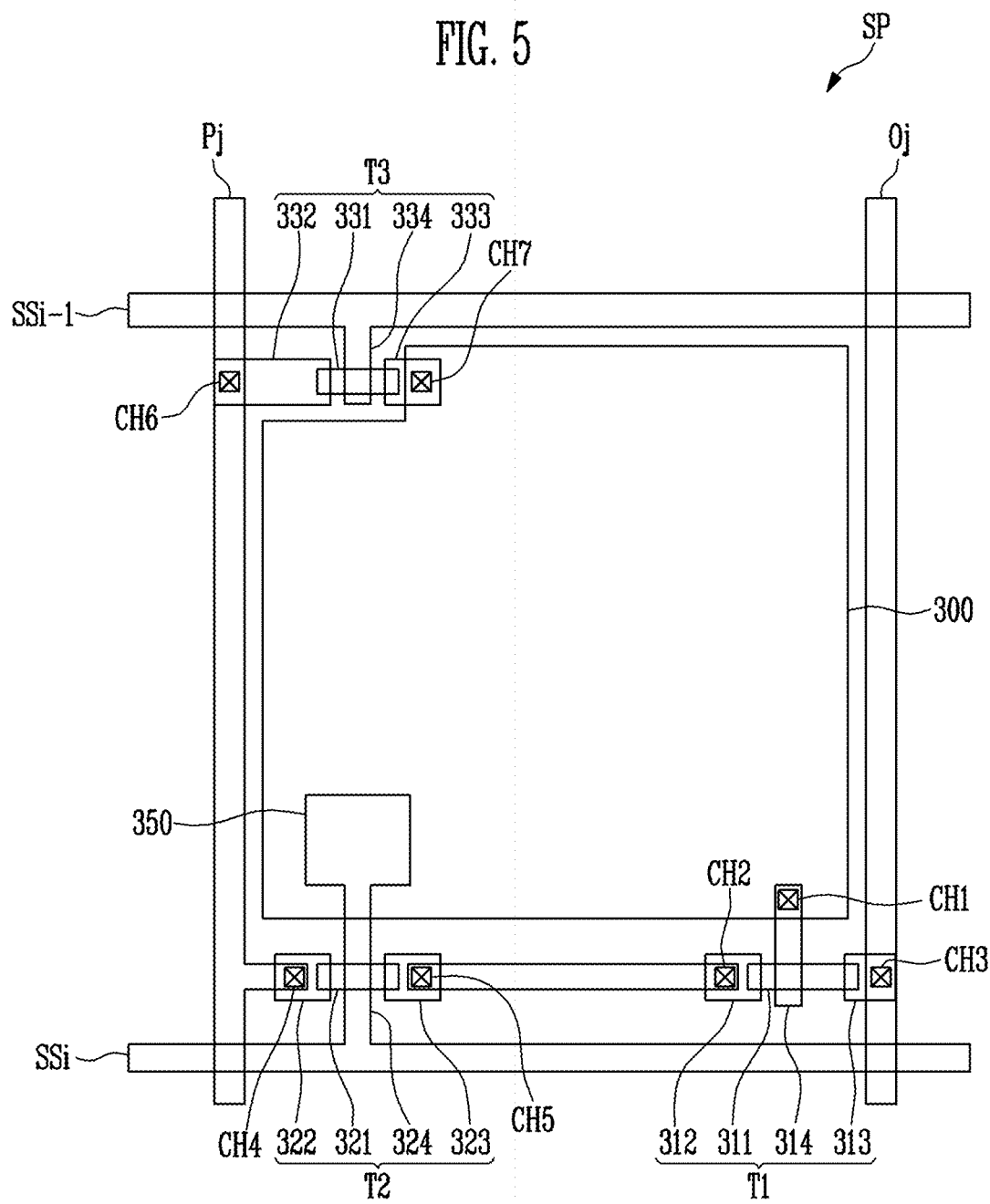

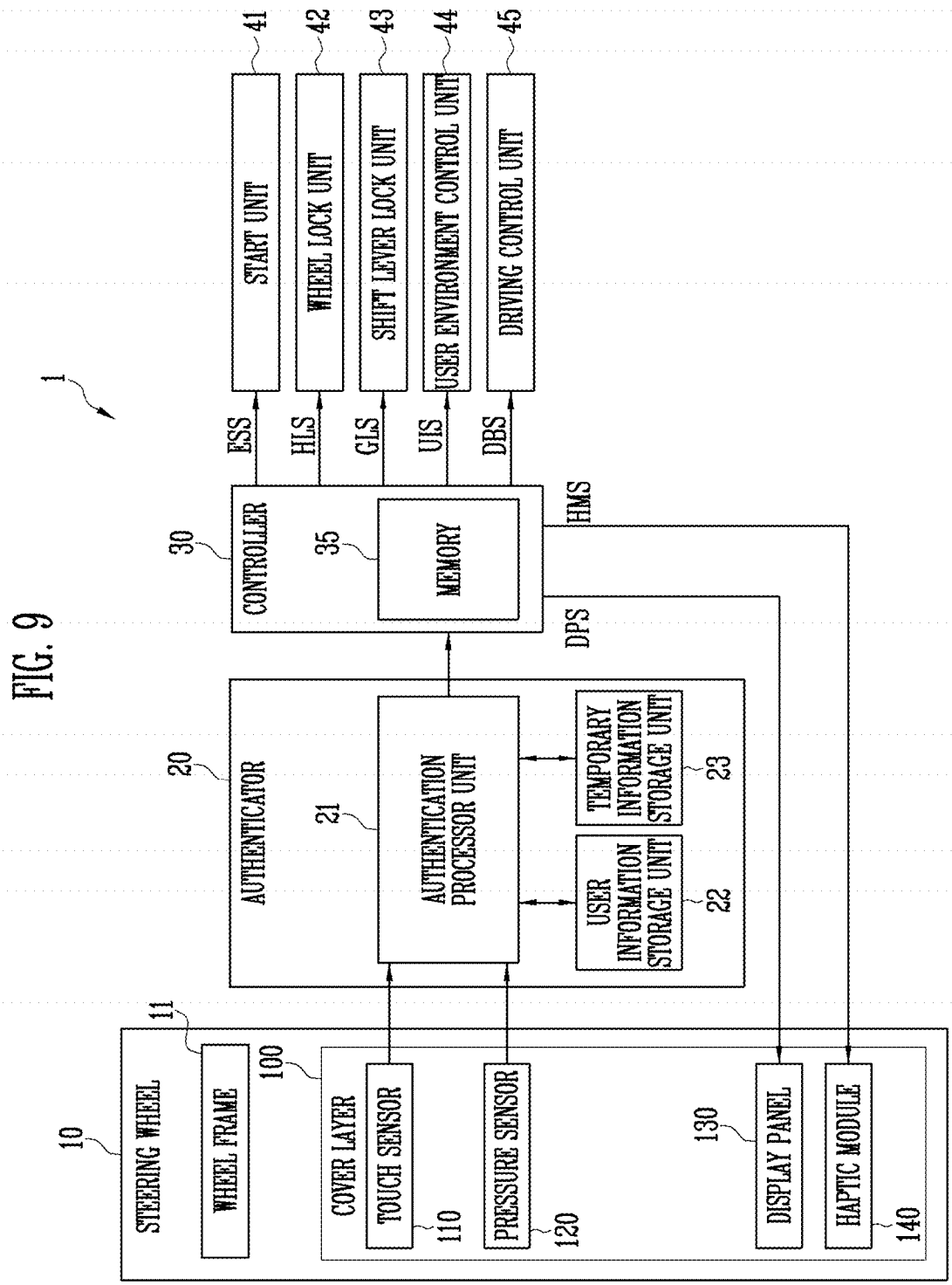

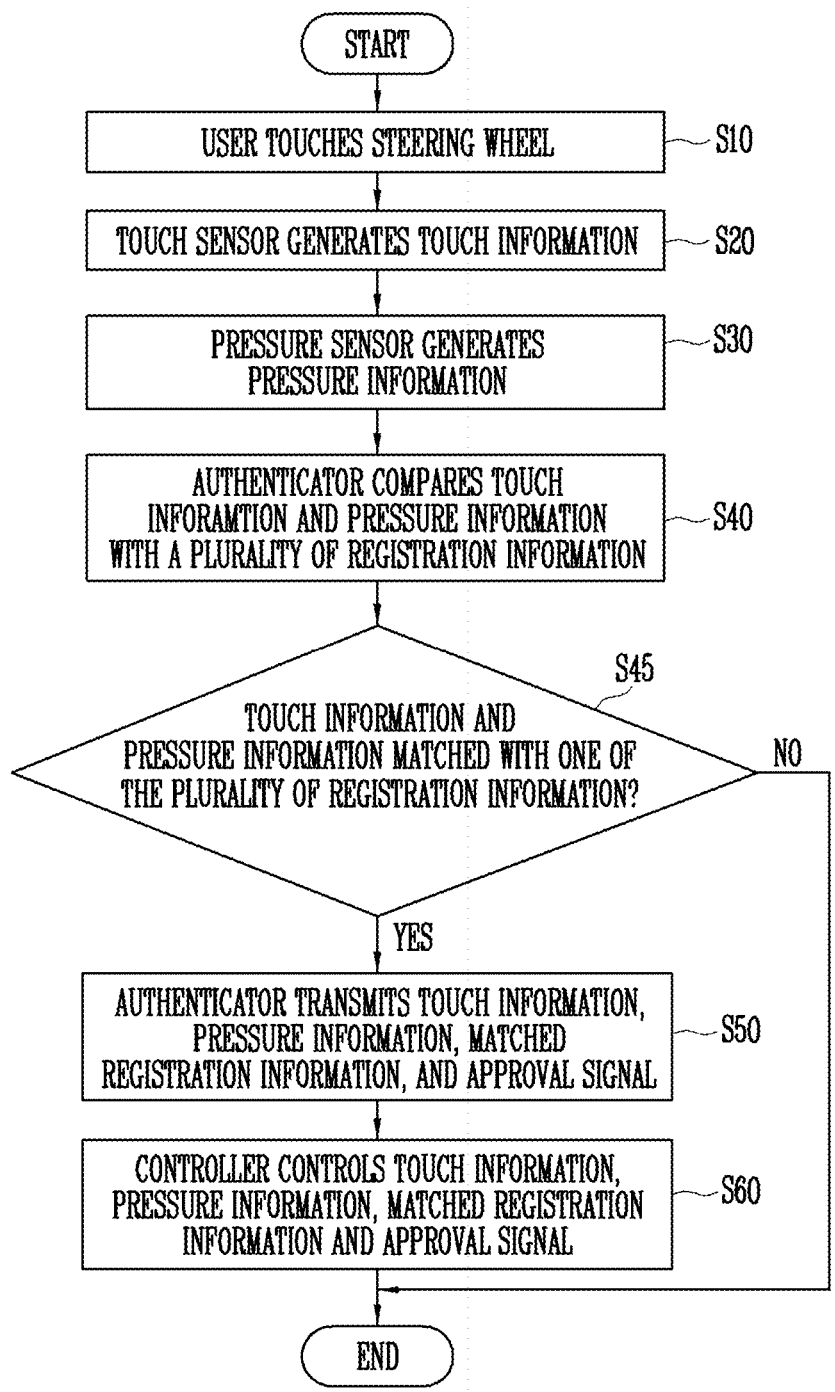

STEERING WHEEL AND VEHICLE CONTROL SYSTEM INCLUDING THE SAME

This application claims priority to Korean Patent Application No. 10-2016-0178007, filed on Dec. 23, 2016, and all the benefits accruing therefrom under 35 U.S.C. § 119, the content of which in its entirety is herein incorporated by reference.

BACKGROUND

1. Field

Exemplary embodiments of the disclosure relate to a steering wheel and a vehicle control system including the steering wheel.

2. Description of the Related Art

Conventionally, a key entry system using a remote controller or a security card has been used to prevent unauthorized access to a vehicle.

In a conventional remote controller type vehicle control system, a user may directly control locking of a door by operating a remote controller. In a conventional security card type vehicle control system, when the user having a security card approaches a vehicle, the door may be unlocked, and when the user enters the vehicle, the user may be authenticated by checking identification ("ID") of the security card.

SUMMARY

The conventional remote controller type vehicle control system and the conventional security card type vehicle control system may cause inconvenience to a user with respect to having to carry a remote controller or a security card. In addition, when the user loses the remote controller or the security card, the user may not access to the vehicle.

Recently, a vehicle control system using a fingerprint recognition system including a function of identifying a user by recognizing a fingerprint of the user has been used to improve convenience and to prevent unauthorized access to a vehicle.

Embodiments of the disclosure are directed to a steering wheel for performing authentication while a user grips the steering wheel to improve security performance and a vehicle control system including the steering wheel.

According to an exemplary embodiment of the disclosure, a steering wheel includes a wheel frame, and a cover layer covering the wheel frame, where the cover layer includes a touch sensor which generates touch information based on a touch of a user, and the touch sensor includes a plurality of sensor pixels which senses a capacitance change corresponding to the touch.

In an exemplary embodiment, the touch information may include information on at least one of finger joint lines of the user, palm lines of the user, a fingerprint of the user, and a position of the touch.

In an exemplary embodiment, the touch sensor may further include a plurality of sensor scan lines connected to the plurality of sensor pixels and a plurality of output lines connected to the plurality of sensor pixels. In such an embodiment, a sensor pixel of the plurality of sensor pixels is connected to an i-th sensor scan line of the plurality of sensor scan lines and a j-th output line of the plurality of output lines, where i is an integer of 2 or greater, and j is a natural number, and the sensor pixel connected to the i-th sensor scan line scan lines and the j-th output line may include a sensor electrode, a first transistor including a gate electrode connected to the sensor electrode, where the first transistor controls a current output through the j-th output line, a second transistor connected between a reference voltage line and the first transistor, where a gate electrode of the second transistor is connected to the i-th sensor scan line, and a capacitor electrode which defines a first capacitor together with the sensor electrode and is connected to the i-th sensor scan line.

In an exemplary embodiment, the sensor pixel may further include a third transistor connected between the reference voltage line and the sensor electrode, wherein a gate electrode of the third transistor is connected to an (i−1)-th scan line of the plurality of sensor scan lines.

In an exemplary embodiment, the sensor electrode may define a second capacitor with a hand of the user when the touch of the user occurs, and the touch sensor may generate the touch information based on a capacitance change of the second capacitor corresponding to the touch.

In an exemplary embodiment, the cover layer may further include a pressure sensor which generates pressure information based on a pressure change by the touch of the user.

In an exemplary embodiment, the cover layer may further include a display panel which displays an image based on the touch information and the pressure information.

In an exemplary embodiment, the cover layer may further include a haptic module which generates a haptic effect based on the touch information and the pressure information.

In an exemplary embodiment, the wheel frame may include a wheel member, a wheel hub disposed at a center of the wheel member, and a wheel spoke connecting the wheel member with the wheel hub, where the cover layer covers an outer surface of at least one of the wheel member, the wheel hub and the wheel spoke.

In an exemplary embodiment, the wheel member may be a rim having a circular donut shape, and the cover layer may have flexibility.

In another exemplary embodiment, a vehicle control system includes a steering wheel including a wheel frame and a cover layer covering the wheel frame, an authenticator which authenticates a user of a vehicle based on touch information and pressure information, and a controller which controls the vehicle based on the touch information, the pressure information and an authentication result. In such an embodiment, the cover layer includes a touch sensor which generates the touch information based on a touch of the user, and a pressure sensor which generates the pressure information based on a pressure change by the touch of the user, where the touch sensor includes a plurality of sensor pixels which senses a capacitance change corresponding to the touch In an exemplary embodiment, the touch information may include information on at least one of finger joint lines of the user, palm lines of the user, a fingerprint of the user and a position of the touch.

In an exemplary embodiment, the wheel frame may include a wheel member, a wheel hub disposed at a center of the wheel member, and a wheel spoke connecting the wheel member with the wheel hub, where the cover layer covers an outer surface of at least one of the wheel member, the wheel hub and the wheel spoke.

In an exemplary embodiment, the authenticator may include an authentication processor unit which compares the touch information and the pressure information with a plurality of registration information and transmits the touch information, the pressure information, matched registration information, and an approval signal to the controller when the touch information and the pressure information are matched with one of the plurality of registration information, where the matched registration information is the one of the plurality of registration information matched with the touch information and the pressure information, a user information storage unit which stores the plurality of registration information, and a temporary information storage unit which stores the touch information and the pressure information.

In an exemplary embodiment, the controller may control the vehicle to start in response to, and the controller may control the steering wheel and a shift lever to be unlocked in response to the approval signal.

In an exemplary embodiment, the controller may provide the user with user environment, which is set beforehand, based on matched registration information in response to the approval signal, and the user environment may include at least one of a position of a wheel, directions of a rear view mirror and a side view mirror, a position and an angle of a driver's seat, an audio channel, and an air conditioner temperature.

In an exemplary embodiment, the controller may control driving of the vehicle based on the touch information and the pressure information in response to the approval signal.

In an exemplary embodiment, the controller may increase a speed of the vehicle when the user grips a first area of the steering wheel at a predetermined pressure or greater, and the controller may reduce the speed of the vehicle when the user grips a second area spaced of the steering wheel, which is apart from the first area, at the predetermined pressure or greater.

In an exemplary embodiment, the cover layer may further include a display panel which displays an image and a haptic module which vibrates according to a vibration pattern.

In an exemplary embodiment, the controller may include a memory which stores the image and the vibration pattern, and the controller may control the display panel to display the image and the haptic module to be driven according to the vibration pattern based on the touch information and the pressure information in response to the approval signal.

BRIEF DESCRIPTION OF THE DRAWINGS

The above and other features of the invention will become more apparent by describing in further detail exemplary embodiments thereof with reference to the accompanying drawings, in which:

FIGS. 1A and 1B are diagrams illustrating a steering wheel according to an embodiment of the disclosure;

FIG. 4 is a partial cross-sectional diagram of a portion of the touch sensor shown in FIG. 3;

FIG. 5 is a plan diagram illustrating a sensor pixel according to an embodiment of the disclosure;

FIG. 9 is a diagram illustrating a vehicle control system according to an embodiment of the disclosure; and FIG. 10 is a flow chart showing an operation method of a vehicle control system according to an embodiment of the disclosure.

DETAILED DESCRIPTION

Figure 2A:
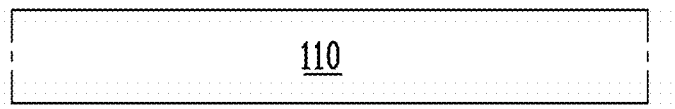
FIGS. 2A to 2C are diagrams illustrating a structure of a cover layer of the steering wheel according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described in detail with reference to the accompanying drawings so that those skilled in the art can easily carry out the disclosure. In order to clearly describe the disclosure in the drawings, parts irrelative to the description will be omitted.

Figure 2B:
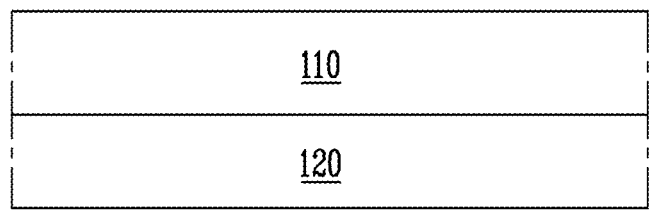
Figure 2C:
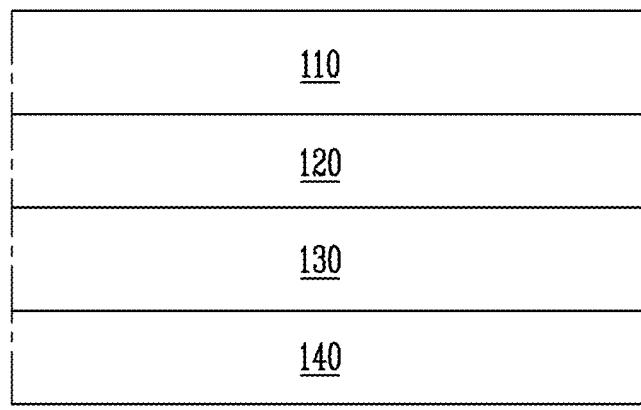

FIGS. 1A and 1B are diagrams illustrating a steering wheel according to an embodiment of the disclosure. FIGS. 2A to 2C are diagrams illustrating the structure of a cover layer of a steering wheel according to an embodiment of the disclosure. FIG. 1A shows a wheel frame 11 of a steering wheel 10 according to an embodiment of the disclosure, and FIG. 1B shows the steering wheel 10 according to an embodiment of the disclosure. FIGS. 2A to 2C show the structure of a cover layer 100 shown in FIG. 1B. For convenience of illustration, in FIG. 1B, the wheel frame 11 is indicated by a broken line.

In an embodiment, as shown in FIGS. 1A and 1B, the steering wheel 10 may be a circular steering device used for changing the direction of a vehicle. According to an embodiment, the steering wheel 10 may include a horn or an airbag.

Referring to FIGS. 1A and 1B, in an embodiment, the steering wheel 10 may include the wheel frame 11 and the cover layer 100. The wheel frame 11 may include a wheel member 12, a wheel hub 13, and a wheel spoke 14.

The wheel member 12 may refer to a rim gripped by a hand of a user. According to an embodiment, the wheel member 12 may be a rim having a circular donut shape.

The wheel hub 13 may be located at the center of the wheel member 12. The wheel hub 13 may be connected to a steering shaft of the vehicle to be rotated with the steering shaft.

The wheel hub 13 may transmit a rotational force received from the wheel member 12 through the wheel spoke 14 to the steering shaft, thereby changing the driving direction of vehicle wheels.

According to an embodiment, various convenience devices (e.g., a horn, an airbag, etc.) may be disposed on an outer surface of the wheel hub 13.

The wheel spoke 14 may transmit a rotational force applied to the wheel member 12 by the user to the wheel hub 13.

According to an embodiment, the wheel spoke 14 may be disposed between the wheel member 12 and the wheel hub 13 to connect the wheel member 12 and the wheel hub 13 to each other.

According to an embodiment, various convenience devices (for example, a horn, an airbag, etc.) may be disposed on an outer surface of the wheel spoke 14.

In an embodiment, as shown in FIGS. 1A and 1B, the wheel frame 11 may include three wheel spokes 14 in FIGS. 1A and 1B, but the disclosure is not limited thereto. According to an embodiment, the number of wheel spokes 14 may vary.

In such an embodiment, the shape of the wheel frame 11 may be variously modified.

The cover layer 100 may cover an outer surface of at least one of the wheel member 12, the wheel hub 13 and the wheel spoke 14. Thus, the cover layer 100 may be directly in contact with the hand of the user. Herein, the term "cover" refers to covering a layer.

In an embodiment, as shown in FIG. 1B, the cover layer 100 may entirely cover the wheel frame 11 in FIG. 1B, but the disclosure is not limited thereto. According to an alternative embodiment, the cover layer 100 may partially cover the wheel frame 11.

The cover layer 100 may have flexibility or be flexible. Herein, "flexibility" refers to the ability to be bent, that is, the quality of being modified in shape without breaking.

FIG. 2A shows an embodiment of a cover layer 100a. Referring to FIG. 2A, the cover layer 100a may include a touch sensor 110.

The touch sensor 110 may sense a touch of the user or a touch thereon by the user. In one embodiment, for example, the touch may occur by a finger, a palm or the like, which is a part of the body of the user, and a sensing object of the touch sensor 110 may include at least one of a position of touch where the touch occurs, finger joint lines, palm lines, and a fingerprint of the user.

The finger joint lines, the palm lines, and the fingerprint of the user may include valleys and ridges.

The touch sensor 110 may generate touch information based on the touch of the user or the touch thereon by the user. In one embodiment, for example, the touch information may include information of at least one of the finger joint lines, the palm lines, the fingerprint of the user, and information of the position of touch.

The touch sensor 110 will be described later in greater detail with reference to FIGS. 3 to 8.

FIG. 2B shows an alternative embodiment of a cover layer 100b.

The cover layer 100b in FIG. 2B is substantially the same as the cover layer 100a shown in FIG. 2A except for a pressure sensor 120. The same or like elements shown in FIG. 2B have been labeled with the same reference characters as used above to describe the embodiments of the cover layer 100a shown in FIG. 2A, and any repetitive detailed description thereof will hereinafter be omitted or simplified.

Referring to FIG. 2B, in an embodiment, the cover layer 100b may include the touch sensor 110 and the pressure sensor 120.

In an embodiment, as shown in FIG. 2B, the touch sensor 110 and the pressure sensor 120 are sequentially stacked, but the disclosure is not limited thereto. In such an embodiment, a stacking order in which the touch sensor 110 and the pressure sensor 120 are stacked may be variously modified.

In such an embodiment, the pressure sensor 120 may sense a pressure change by the touch of the user or change in pressure caused by the touch of the user. In one embodiment, for example, the pressure change may be caused by the finger, the palm or the like, which is the part of the body of the user, and the sensing object of the pressure sensor 120 may include at least one of the position of touch and the pressure change by the touch.

The pressure sensor 120 may generate pressure information based on the pressure change by the touch of the user.

In one embodiment, for example, the pressure information may include information on the position of touch and distribution of a change in the pressure applied to the steering wheel 10 by the user.

FIG. 2C shows another alternative embodiment of a cover layer 100c.

The cover layer 100c shown in FIG. 2C is substantially the same as the cover layer 100b of FIG. 2B except for a display panel 130 and a haptic module 140. The same or like elements shown in FIG. 2C have been labeled with the same reference characters as used above to describe the embodiments of the cover layer 100b shown in FIG. 2B, and any repetitive detailed description thereof will hereinafter be omitted or simplified.

Referring to FIG. 2C, in an embodiment, the cover layer 100c may include the touch sensor 110, the pressure sensor 120, the display panel 130, and the haptic module 140.

In an embodiment, as shown in FIG. 2C, the touch sensor 110, the pressure sensor 120, the display panel 130 and the haptic module 140 are sequentially stacked one on another, but the disclosure is not limited thereto. According to an embodiment, a stacking order of the touch sensor 110, the pressure sensor 120, the display panel 130 and the haptic module 140 may be variously modified.

The display panel 130 may display an image corresponding to input image data. According to an embodiment, the display panel 130 may be a liquid crystal display panel ("LCD"), an organic light emitting display panel ("OLED"), an electrophoretic display panel, an electro wetting display panel or the like, but the types thereof are not limited.

The display panel 130 may have flexibility. In such an embodiment, the display panel 130 may be flexible in a way such that the display panel 130 may be bent by an external force. In such an embodiment, the display panel 130 may be a plastic panel or a thin metal panel.

According to an embodiment, the display panel 130 may display an image in response to control of a controller 30 (refer to FIG. 9).

According to an embodiment, the display panel 130 may display an image at an edge of a portion of the cover layer 100 in contact with the user, and the image may correspond to an operation state of the vehicle.

The haptic module 140 may generate various haptic effects that the user may feel. In one embodiment, for example, the haptic module 140 may generate a vibration as the haptic effect.

The haptic module 140 may vibrate according to at least one of a plurality of vibration patterns. The haptic module 140 may provide vibration corresponding to at least one of the plurality of vibration patterns to the user.

According to an embodiment, the intensity and pattern of vibration generated in the haptic module 140 may be controlled by the controller 30 (refer to FIG. 9). In one embodiment, for example, the haptic module 140 may synthesize different vibration patterns to output a synthesized pattern or sequentially output the vibration patterns.

According to an embodiment, the haptic module 140 may provide vibration in a portion of the cover layer 100 that is in contact with the user.

The haptic module 140 may produce at least one of various haptic effects such as an effect by stimulation, for example, an arrangement of pins vertically moving with respect to a contact surface of the skin, a spraying force or a suction force of air through an injection port or an suction port, a touch on a skin surface, a contact of an electrode, an electrostatic force, etc., and an effect by reproducing cooling and warming effects using a device capable of absorbing or radiating heat, in addition to vibration.

The haptic module 140 may provide the haptic effect to the user through direct contact with the user and allow the user to feel the haptic effect through the muscle sense of the user's fingers or arms.

Figure 3:
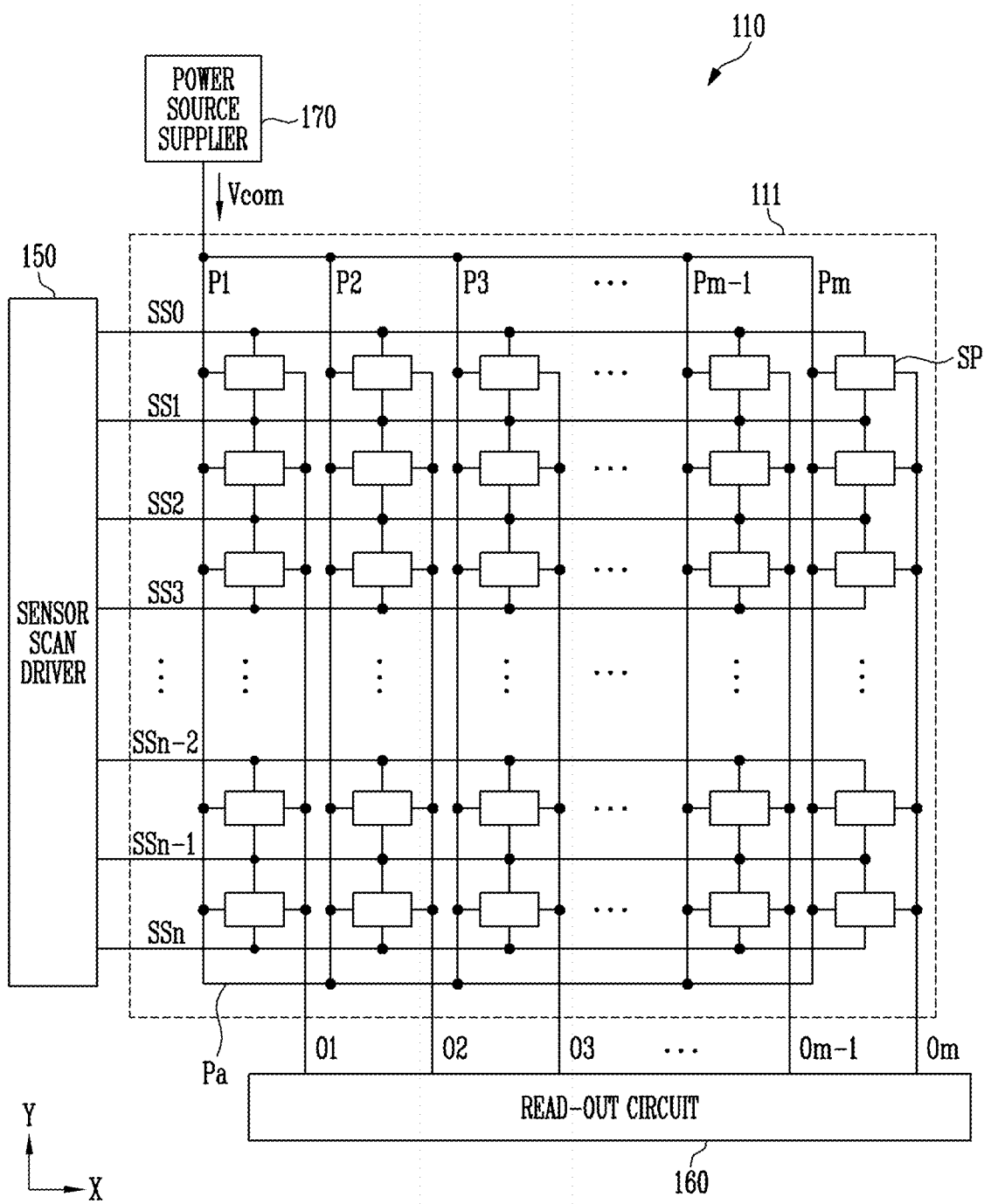
FIG. 3 is a diagram illustrating a touch sensor according to an embodiment of the disclosure.

FIG. 3 is a diagram illustrating a touch sensor according to an embodiment of the disclosure, and FIG. 4 is a partial cross-sectional diagram of a portion of the touch sensor shown in FIG. 3.

An embodiment of the touch sensor 110 ac may sense a touch by a user.

Referring to FIGS. 3 and 4, in an embodiment, the touch sensor may include a substrate 111 and a plurality of sensor pixels SP.

In an embodiment, the substrate 111 may include or be formed of an insulating material such as glass, resin, and the like. In an embodiment, the substrate 111 may include or be formed of a material having flexibility to be bent or folded, and may have a single-layer structure or a multi-layer structure.

In one embodiment, for example, the substrate 111 may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate.

However, a material of the substrate 111 may not be limited those listed above. In an embodiment, the substrate 111 may include fiber glass reinforced plastic ("FRP"), for example.

In an embodiment, as shown in FIG. 4, the sensor pixels SP may be disposed on the substrate 111 substantially in a matrix form. In such an embodiment, the sensor pixels SP may be connected to sensor scan lines SS0 to SSn, and output lines O1 to Om.

The sensor pixels SP may receive sensor scan signals through the sensor scan lines SS0 to SSn, and the sensor pixels SP may output a predetermined current corresponding to a touch state to the output lines O1 to Om when the sensor scan signals are supplied.

The sensor scan lines SS0 to SSn may be disposed on the substrate 111, and each of the sensor scan lines SS0 to SSn extends in a first direction (e.g., an X-axis direction) to be connected to the sensor pixels SP in a corresponding pixel row.

The output lines O1 to Om may be disposed on the substrate 111, and each of the output lines O1 to Om extends in a second direction (e.g., a Y-axis direction) to be connected to the sensor pixels SP in a corresponding pixel column.

In an embodiment, the sensor pixels SP may be connected to reference voltage lines P1 to Pm, and receive a reference voltage Vcom therethrough.

Each of the reference voltage lines P1 to Pm may extend in the second direction (e.g., the Y-axis direction) and be connected to the sensor pixels SP in a corresponding pixel column.

In one embodiment, for example, the reference voltage lines P1 to Pm may be arranged in parallel with the output lines O1 to Om.

However, the arrangement directions of the reference voltage lines P1 to Pm may be variously modified. In one alternative embodiment, for example, the reference voltage lines P1 to Pm may be arranged in parallel with the sensor scan lines SS0 to SSn.

The reference voltage lines P1 to Pm may be electrically connected to one another to maintain the same potential as each other.

In one embodiment, for example, the reference voltage lines P1 to Pm may be electrically connected to one another through an additional wire Pa at a side portion of the substrate 111.

In an embodiment, the touch sensor 110 may further include a sensor scan driver 150 for driving the touch sensor 110, a read-out circuit 160, and a power source supplier 170.

The sensor scan driver 150 may supply sensor scan signals to the sensor pixels SP through the sensor scan lines SS0 to SSn.

In one embodiment, for example, the sensor scan driver 150 may sequentially output the sensor scan signals to the sensor scan lines SS0 to SSn.

In an embodiment, each of the sensor pixels SP may include transistor, and a sensor scan signal is applied thereto. In such an embodiment, the sensor scan signal may have a voltage level at which the transistor is turned on.

In an embodiment, the sensor scan driver 150 may be directly mounted on the substrate 111 or be connected to the substrate 111 through an additional component such as a flexible printed circuit board, etc., to be connected with the sensor scan lines SS0 to SSn.

The read-out circuit 160 may receive a signal (e.g., a current) output from the sensor pixels SP through the output lines O1 to Om.

In one embodiment, for example, when the sensor scan driver 150 sequentially supplies the sensor scan signals, the sensor pixels SP may be selected, e.g., turned-on, on a line-by-line basis, and the read-out circuit 160 may sequentially receive currents output from the sensor pixels SP on the line-by-line basis.

The read-out circuit 160 may recognize current touch information by sensing variation in the current output from the sensor pixels SP.

In one embodiment, for example, touch information may include information on at least one of the finger joint lines, the palm lines, and the fingerprint of the user, and information of the position of touch.

In an embodiment, the read-out circuit 160 may be directly mounted on the substrate 111 or be connected to the substrate 111 through the additional component such as the flexible circuit board, etc., to be connected with the output lines O1 to Om.

The power source supplier 170 may supply the reference voltage Vcom to the sensor pixels SP through the reference voltage lines P1 to Pm.

In an embodiment, the power source supplier 170 may be directly mounted on the substrate 111 or connected to the substrate 111 through an additional component such as a flexible circuit board, etc., to be connected with the reference voltage lines P1 to Pm.

Although the sensor scan driver 150, the read-out circuit 160, and the power source supplier 170 are separately shown in FIG. 3, at least some of the constituents may be integrated as desired.

In an embodiment, the sensor scan driver 150, the read-out circuit 160, and the power source supplier 170 may be mounted by various methods such as a chip-on-glass, a chip-on-plastic, a tape carrier package, a chip-on-film, and the like.

FIG. 5 is a plan diagram illustrating a sensor pixel according to an embodiment of the disclosure. In FIG. 5, for convenience of illustration and description, only one sensor pixel connected to an i-th sensor scan line SSi and a j-th output line Oj is shown, among the sensor pixels SP. Here, i is an integer of 2 or more, and j is a natural number, Referring to FIG. 5, in an embodiment, the sensor pixel SP may include a sensor electrode 300, a first transistor T1, a second transistor T2, a third transistor T3, and a capacitor electrode 350.

The first transistor T1 may control a current flowing through the j-th output line Oj. The first transistor T1 may be connected between the j-th output line Oj and the second transistor T2.

In one embodiment, for example, the first transistor T1 may include a first electrode 312 connected to a second electrode 323 of the second transistor T2, a second electrode 313 connected to the j-th output line Oj, a gate electrode 314 connected to the sensor electrode 300, and a semiconductor layer 311 connected between the first electrode 312 and the second electrode 313.

In such an embodiment, the gate electrode 314, the first electrode 312, and the second electrode 313 of the first transistor T1 may be connected to other constituents through first to third contact holes CH1, CH2 and CH3, respectively.

Therefore, the first transistor T1 may control an output current Io output to the j-th output line Oj corresponding to a potential of the sensor electrode 300.

The second transistor T2 may be connected between a j-th reference voltage line Pj and the first transistor T1.

In one embodiment, for example, the second transistor T2 may include a first electrode 322 connected to the j-th reference voltage line Pj, a second electrode 323 connected to the first electrode 312 of the first transistor T1, a gate electrode 324 connected to the i-th sensor scan line SSi, and a semiconductor layer 321 connected between the first electrode 322 and the second electrode 323.

In such an embodiment, the first electrode 322 and the second electrode 323 of the second transistor T2 may be connected to other constituents through fourth and fifth contact holes CH4 and CH5, respectively.

Therefore, the second transistor T2 may be turned on when a sensor scan signal is supplied to the i-th sensor scan line SSi. When the second transistor T2 is turned on, the reference voltage Vcom may be applied to the first electrode 312 of the first transistor T1.

The third transistor T3 may be connected between the j-th reference voltage line Pj and the sensor electrode 300.

In one embodiment, for example, the third transistor T3 may include a first electrode 332 connected to the j-th reference voltage line Pj, a second electrode 333 connected to the sensor electrode 300, a gate electrode 334 connected to an (i−1)-th sensor scan line SSi−1, and a semiconductor layer 331 connected between the first electrode 332 and the second electrode 333.

In such an embodiment, the first electrode 332 and the second electrode 333 of the third transistor T3 may be connected to other constituents through sixth and seventh contact holes CH6 and CH7, respectively.

Therefore, the third transistor T3 may be turned on when a sensor scan signal is supplied to the (i−1)-th sensor scan line SSi−1. When the third transistor T3 is turned on, a voltage of the sensor electrode 300 may be initialized to the reference voltage Vcom.

The capacitor electrode 350 may be disposed to overlap with the sensor electrode 300, such that a capacitor is defined or formed by the capacitor electrode 350 together with the sensor electrode 300.

In an embodiment, the capacitor electrode 350 may be connected to the i-th sensor scan line SSi. In one embodiment, for example, the capacitor electrode 350 may be connected to the i-th sensor scan line SSi through the gate electrode 324 of the second transistor T2.

The capacitor electrode 350 and the gate electrode 324 of the second transistor T2 may include or be formed of the same material as the i-th sensor scan line SSi.

The sensor electrode 300 may defined or form a capacitor together with the capacitor electrode 350, a finger of the user, etc.

In an embodiment, the sensor electrode 300 may include a conductive material. In such an embodiment, the conductive material may include a metal, an alloy thereof, a conductive polymer, a transparent conductive material, or the like.

In such an embodiment, the metal may include copper, silver, gold, platinum, palladium, nickel, tin, aluminum, cobalt, rhodium, iridium, iron, ruthenium, osmium, manganese, molybdenum, tungsten, niobium, tantalum, titanium, bismuth, antimony, lead, or the like, for example.

In such an embodiment, the conductive polymer may include a polythiophene-based compound, a polypyrrole-based compound, a polyaniline-based compound, a polyacetylene-based compound, a polyphenylene-based compound, or a mixture thereof, for example. In one embodiment, for example, a poly(3,4-ethylenedioxythiophene) polystyrene sulfonate ("PEDOT:PSS") compound may be used as the conductive polymer.

In such an embodiment, the transparent conductive material may include a silver nanowire ("AgNW"), indium tin oxide ("ITO"), indium zinc oxide ("IZO"), antimony zinc oxide ("AZO"), indium tin zinc oxide ("ITZO"), zinc oxide (ZnO), and tin oxide (SnO2), carbon nanotubes, graphene, or the like, for example.

Figure 6:
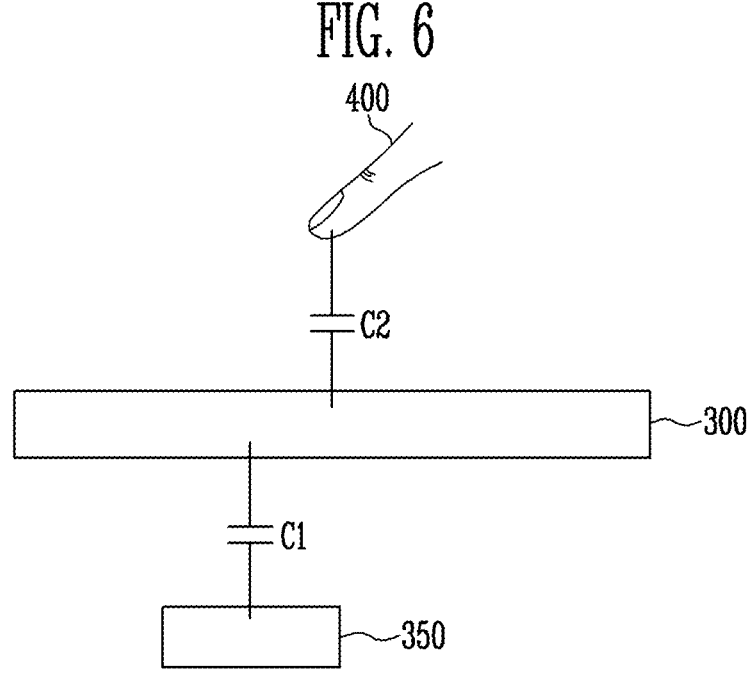
FIG. 6 is a cross-sectional diagram illustrating the sensor pixel according to an embodiment of the disclosure.

FIG. 6 is a cross-sectional diagram illustrating the sensor pixel according to an embodiment of the disclosure. Specifically, FIG. 6 schematically shows a cross-section of the sensor pixel SP of FIG. 5 when a finger 400 is located on the sensor pixel SP.

Referring to FIGS. 3 to 6, a sensor protection layer (not shown) may be disposed on the sensor electrode 300, and the sensor protection layer (not shown) may be used as a surface on which the touch by the user occurs.

The sensor electrode 300 and the capacitor electrode 350 may define or form a first capacitor C1. The sensor electrode 300 and the capacitor electrode 350 may be spaced apart from each other with an insulating layer (not shown) interposed therebetween.

The sensor electrode 300 and the finger 400 of the user may define or form a second capacitor C2. A capacitance of the second capacitor C2 may vary depending on a distance between the sensor electrode 300 and the finger 400.

Thus, a capacitance of the second capacitor C2 in a state where a touch is generated by the finger 400 and a capacitance of the second capacitor C2 in a state where no touch is generated may be different from each other.

In such an embodiment, a capacitance of the second capacitor C2 when the ridges of the finger 400 (e.g., the fingerprint thereof) are located on the sensor electrode 300 and a capacitance of the second capacitor C2 when the valleys of the finger 400 are located on the sensor electrode 300 may be different from each other.

Since the change in the capacitance of the second capacitor C2 affects the output current Io of the sensor pixel SP, the read-out circuit 160 may determine whether a touch is generated and recognize the fingerprint of the user by detecting the variation in the output current Io.

In such an embodiment, the read-out circuit 160 may recognize the finger joint lines and the palm lines of the user using the above-described manner.

Figure 7:
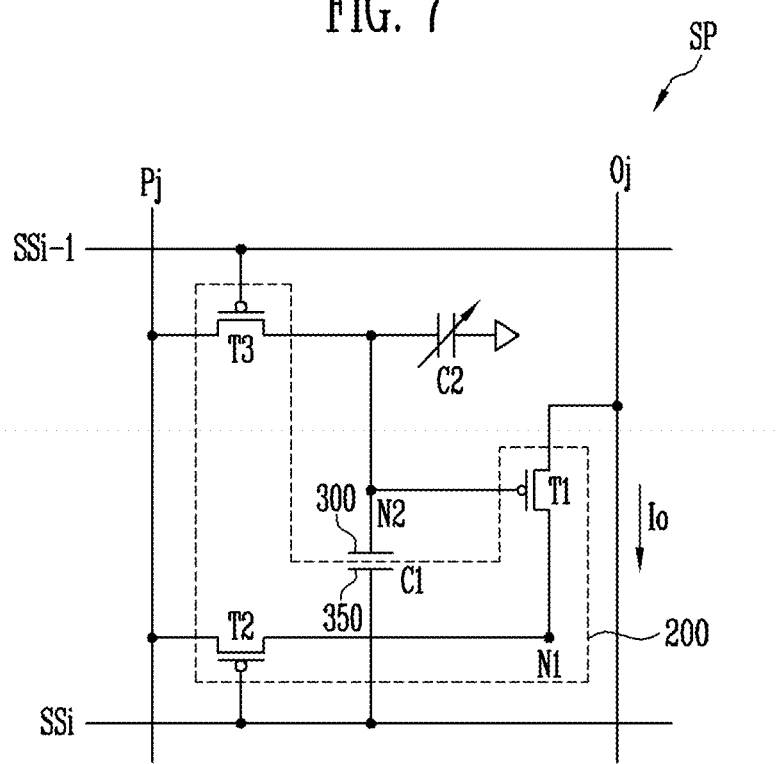
FIG. 7 is an equivalent circuit diagram of an embodiment of the sensor pixel shown in FIG. 5.
Figure 8:
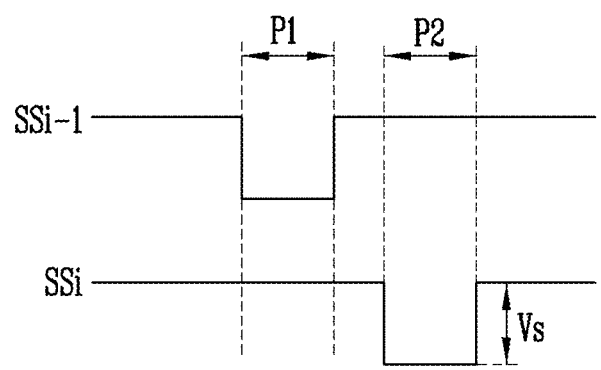
FIG. 8 is a waveform diagram illustrating an operation of the sensor pixel shown in FIG. 7.

FIG. 7 is an equivalent circuit diagram of an embodiment of the sensor pixel shown in FIG. 5, and FIG. 8 is a waveform diagram illustrating an operation of a sensor pixel shown in FIG. 7.

For convenience of illustration, among the sensor pixels SP, only the sensor pixel SP connected to the i-th sensor scan line SSi, the (i−1)-th sensor scan line SSi−1, and the j-th output line Oj is shown in FIG. 7. In addition, in FIG. 8, a sensor scan signal supplied to the (i−1)-th sensor scan line SSi−1 and a sensor scan signal supplied to the i-th sensor scan line SSi are shown.

Referring to FIG. 7, the sensor pixel SP may include the sensor electrode 300, the capacitor electrode 350, the first transistor T1, the second transistor T2, and the third transistor T3.

In such an embodiment, as described above, the sensor electrode 300 and the capacitor electrode 350 may constitute the first capacitor C1, and the capacitor electrode 350, the first transistor T1, the second transistor T2 and the third transistor T3 may constitute a sensor circuit 200.

In such an embodiment, the second capacitor C2 may be a variable capacitor and defined by the sensor electrode 300 and the finger 400 as described above. A capacitance of the second capacitor C2 may vary depending on the distance between the sensor electrode 300 and the finger 400, whether the valleys or the ridges of the fingerprint are located on the sensor electrode 300, and an intensity of a pressure caused by the touch.

The first transistor T1 may control the current flowing through the j-th output line Oj. The first transistor T1 may be connected between the j-th output line Oj and the second transistor T2.

In such an embodiment, the first transistor T1 may be connected between the j-th output line Oj and a first node N1, and a gate electrode thereof may be connected to a second node N2.

In one embodiment, for example, the first transistor T1 may include a first electrode connected to a second electrode of the second transistor T2, a second electrode connected to the j-th output line Oj, and the gate electrode connected to the sensor electrode 300.

The second transistor T2 may be connected between the j-th reference voltage line Pj and the first transistor T1.

In such an embodiment, the second transistor T2 may be connected between the j-th reference voltage line Pj and the first node N1, and a gate electrode thereof may be connected to the i-th sensor scan line SSi.

In one embodiment, for example, the second transistor T2 may include a first electrode connected to the j-th reference voltage line Pj, the second electrode connected to the first electrode of the first transistor T1, and the gate electrode connected to the i-th sensor scan line SSi.

Accordingly, the second transistor T2 may be turned on when the sensor scan signal is supplied to the i-th sensor scan line SSi. When the second transistor T2 is turned on, the reference voltage Vcom may be applied to the first electrode of the first transistor T1.

The third transistor T3 may be connected between the j-th reference voltage line Pj and the sensor electrode 300.

In such an embodiment, the third transistor T3 may be connected between the second node N2 and the j-th reference voltage line Pj, and a gate electrode thereof may be connected to the (i−1)-th sensor scan line SSi−1.

In one embodiment, for example, the third transistor T3 may include the first electrode connected to the j-th reference voltage line Pj, a second electrode connected to the sensor electrode 300, and the gate electrode connected to the (i−1)-th sensor scan line SSi−1.

Therefore, the third transistor T3 may be turned on when the sensor scan signal is supplied to the (i−1)-th sensor scan line SSi−1. When the third transistor T3 is turned on, the voltage of the sensor electrode 300 may be initialized to the reference voltage Vcom.

The capacitor electrode 350 may be disposed to overlap with the sensor electrode 300, such that the first capacitor C1 may be defined or formed by the capacitor electrode 350 together with the sensor electrode 300.

In such an embodiment, the capacitor electrode 350 may be connected to the i-th sensor scan line SSi.

Accordingly, the first capacitor C1 may be connected between the second node N2 and the i-th sensor scan line SSi.

In such an embodiment, the second capacitor C2 may be connected to the second node N2.

The first electrode of the first transistor T1 and the second electrode of the second transistor T2 may be commonly connected to the first node N1, and the sensor electrode 300, the gate electrode of the first transistor T1 and the second electrode of the third transistor T3 may be commonly connected to the second node N2.

The first electrode of each of the first to third transistors T1, T2 and T3 may be one of a source electrode and a drain electrode, and the second electrode of each of the first to third transistors T1, T2 and T3 may be the other of the source electrode and the drain electrode. In one embodiment, for example, the first electrode may be the source electrode and the second electrode may be the drain electrode.

In an embodiment, the first to third transistors T1, T2 and T3 may be P-type metal-oxide-semiconductor ("PMOS") transistors. However, in an alternative embodiment, the first to third transistors T1, T2 and T3 may be N-type metal-oxide-semiconductor ("NMOS") transistors.

FIG. 8 is a waveform diagram illustrating an operation of the sensor pixel shown in FIG. 7. Referring to FIG. 8, a sensor scan signal may be supplied to the (i−1)-th sensor scan line SSi−1 during a first period P1.

When the sensor scan signal may be supplied to the (i−1)-th sensor scan line SSi−1 in the first period P1, the third transistor T3 may maintain a turn-on state during the first period P1, and the second node N2 may be initialized to the reference voltage Vcom applied from the j-th reference voltage line Pj during the first period P1.

As shown in FIG. 8, the sensor scan signal may be supplied to the i-th sensor scan line SSi during a second period P2.

When the sensor scan signal is supplied to the i-th sensor scan line SSi in the second period P2, the second transistor T2 may maintain the turned-on state during the second period P2, and the output current Io may flow from the j-th reference voltage line Pj to the j-th output line Oj through the second transistor T2 and the first transistor T1 during the second period P2.

The first transistor T1 may control the amount of the output current Io corresponding to a gate voltage (a voltage of the second node N2).

In one embodiment, for example, the output current Io may be changed according to a gate voltage Vg of the first transistor T1, and the gate voltage Vg of the first transistor T1 may satisfy the following equation: $Vg=Vcom+\{Vc1/(Vc1+Vc2)\} \times Vs$.

In the equation above, Vcom denotes a reference voltage, Vc1 denotes a capacitance of the first capacitor C1, Vc2 denotes a capacitance of the second capacitor C2, and Vs denotes the voltage variation in the sensor scan signal supplied to the i-th sensor scan line SSi.

FIG. 9 is a diagram illustrating a vehicle control system according to an embodiment of the disclosure. Referring to FIG. 9, an embodiment of a vehicle control system 1 may include the steering wheel 10, an authenticator 20, and the controller 30.

In such an embodiment, the steering wheel 10 may include the wheel frame 11 and the cover layer 100.

The cover layer 100 may include the touch sensor 110, the pressure sensor 120, the display panel 130, and the haptic module 140.

The touch sensor 110 may sense a touch of a user or a touch thereon by the user, and generate touch information based on the touch. The touch sensor 110 may transmit the generated touch information to the authenticator 20.

The pressure sensor 120 may sense a pressure change by the touch of the user, and generate pressure information based on the pressure change. In such an embodiment, the pressure sensor 120 may transmit the generated pressure information to the authenticator 20.

The display panel 130 may display an image based on a display panel control signal DPS received from the controller 30. In one embodiment, for example, the display panel control signal DPS may include image data for at least one of a plurality of images.

The haptic module 140 may produce various haptic effects that the user may feel based on a haptic module control signal HMS received from the controller 30. In an embodiment, the haptic module 140 may vibrate according to the plurality of vibration patterns. In one embodiment, for example, the haptic module control signal HMS may include vibration data for at least one of the plurality of vibration patterns.

The authenticator 20 may authenticate the user of the vehicle based on the touch information and the pressure information.

According to an embodiment, the authenticator 20 may include an authentication processor unit 21, a user information storage unit 22, and a temporary information storage unit 23.

The authentication processor unit 21 may receive the touch information and the pressure information, and store the touch information and the pressure information in the temporary information storage unit 23.

The authentication processor unit 21 may compare the touch information and the pressure information with a plurality of registration information stored in the user information storage unit 22. In one embodiment, for example, the authentication processor unit 21 may check whether the touch information and the pressure information are matched with any one of the plurality of registration information.

When the touch information and the pressure information are matched with any one of the plurality of registration information, the authentication processor unit 21 may transmit the touch information, the pressure information, the matched registration information, and an approval signal to the controller 30. Accordingly, in such an embodiment, the authentication processor unit 21 may authenticate a user and transmit the touch information, the pressure information, the matched registration information, and the approval signal to the controller 30 when the user is a registered user.

Each of the registration information may include touch information and/or pressure information of each user.

In an embodiment, each of the registration information may further include user environment information of a corresponding user. In one embodiment, for example, the user environment information may include information on at least one of a position of a wheel set beforehand for the user, directions of a rear view mirror and a side view mirror, a position and an angle of a driver's seat, an audio channel, and an air conditioner temperature.

The user information storage unit 22 may store the plurality of registration information and provide the plurality of registration information to the authentication processor unit 21 under the control of the authentication processor unit 21.

The temporary information storage unit 23 may store the touch information and the pressure information and provide the touch information and the pressure information to the authentication processor unit 21 under the control of the authentication processor unit 21.

In an embodiment, the user information storage unit 22 and the temporary information storage unit 23 may be integrated into a single unit and may be included in the authentication processor unit 21.

The controller 30 may receive the touch information, the pressure information, the matched registration information, and the approval signal from the authenticator 20.

The controller 30 may control the overall operation of the vehicle based on the touch information, the pressure information, the matched registration information, and the approval signal.

In one embodiment, for example, the controller 30 may start the vehicle by transmitting a start approval signal ESS to a start unit 41 in response to the approval signal. In such an embodiment, the controller 30 may release a locked state of the steering wheel 10 by transmitting a wheel release signal HLS to a wheel lock unit 42 in response to the approval signal. In such an embodiment, the controller 30 may release a locked state of a shift lever by transmitting a shift lever lock release signal GLS to a shift lever lock unit 43 in response to the approval signal.

Therefore, the controller 30 may control starting, locking of the steering wheel, and locking of the shift lever based on the touch information and the pressure information of the user, so that the steering wheel 10 and the vehicle control system 1 including the steering wheel 10 may have improved security performance.

In one embodiment, for example, in response to the approval signal, the controller 30 may transmit a user environment set signal UIS to a user environment control unit 44 based on the matched registration information to provide the user with user environment set beforehand.

In such an embodiment, the controller 30 may control at least one of the position of the wheel set beforehand for each user, directions of the rear view mirror and the side view mirror, the position and the angle of the driver's seat, the audio channel, and the air conditioner temperature based on user environment information set beforehand for each user.

According to an embodiment, the user environment information set beforehand for each user may be included in each of the plurality of registration information, but the disclosure is not limited thereto. The user environment information set beforehand for each user may be stored in a memory 35 of the controller 30.

Accordingly, in such an embodiment, the controller 30 may provide the user with the user environment set beforehand based on the touch information and the pressure information of the user, so that the steering wheel 10 and the vehicle control system 1 including the steering wheel 10 a may provide optimal user environment for each user.

In one embodiment, for example, in response to the approval signal, the controller 30 may control driving of the vehicle by transmitting a driving control signal DBS to a driving control unit 45 based on a touch signal and a pressure signal.

According to an embodiment, when the user grips a first area of the steering wheel 10 at a predetermined pressure or more, although the user does not step on an accelerator of the vehicle, a speed of the vehicle may be increased.

According to an embodiment, when the user grips a second area of the steering wheel 10 at a predetermined pressure or more, although the user does not step on a brake of the vehicle, the speed of the vehicle may be reduced.

In one embodiment, for example, the second area may be spaced apart from the first area.

Accordingly, in such an embodiment, the controller 30 may control driving of the vehicle on the basis of the touch information and the pressure information of the user, so that the steering wheel 10 and the vehicle control system 1 including the same according to an embodiment of the disclosure may allow the user to control driving of the vehicle by using a griping force on the steering wheel 10 by the user.

In one embodiment, for example, in response to the approval signal, the controller 30 may transmit the display panel control signal DPS to the display panel 130 based on the touch signal and the pressure signal to control the display panel 130 to display at least one of the plurality of images.

In one embodiment, for example, in response to the approval signal, the controller 30 may transmit the haptic module control signal HMS to the haptic module 140 based on the touch signal and the pressure signal to control the haptic module 140 to vibrate according to at least one of the plurality of vibration patterns.

The controller 30 may include the memory 35.

The memory 35 may include the plurality of images and the plurality of vibration patterns.

According to an embodiment, the memory 35 may store the user environment information set beforehand for each user. However, the disclosure is not limited thereto.

FIG. 10 is a flow chart showing an operation method of a vehicle control system according to an embodiment of the disclosure.

Referring to FIGS. 1A to 10, the user may touch the steering wheel 10 with hands (S10).

In such an embodiment, the touch sensor 110 may generate touch information (S20).

In such an embodiment, the pressure sensor 120 may generate pressure information (S30).

In such an embodiment, the authenticator 20 may compare the touch information and the pressure information with a plurality of registration information (S40).

In such an embodiment, when the touch information and the pressure information are matched with one of the plurality of registration information (YES in S45), the authenticator 20 may transmit the touch information, the pressure information, the matched registration information, and an approval signal to the controller 30 (S50).

In such an embodiment, the controller 30 may control the vehicle based on the touch information, the pressure information, the matched registration information and the approval signal (S60).

According to an embodiment of the disclosure, a steering wheel and a vehicle control system including the steering wheel may perform authentication while a user grips the steering wheel.

According to an embodiment of the disclosure, the steering wheel and the vehicle control system including the steering wheel may have improved security performance.

According to an embodiment of the disclosure, the steering wheel and the vehicle control system including the steering wheel may provide optimal user environment for each user.

According to an embodiment of the disclosure, the steering wheel and the vehicle control system including the steering wheel may control driving of a vehicle by using a griping force when the user grips the steering wheel.

It will be apparent to those skilled in the art that the disclosure may be embodied in other specific forms without departing from the spirit or essential characteristics thereof. It is therefore to be understood that the above-described embodiments are illustrative in all aspects and not restrictive. The scope of the disclosure is defined by the appended claims rather than by the foregoing description, and all changes or modifications derived from the meaning and scope of the claims and the equivalents thereof are included in the scope of the disclosure Should be interpreted.

What is claimed is:

1. A steering wheel, comprising:
a wheel frame; and
a cover layer covering the wheel frame,
wherein the cover layer comprises a touch sensor which generates touch information based on a touch of a user,
wherein the touch sensor comprises:
   a plurality of sensor pixels which sense a capacitance change corresponding to the touch;
   a plurality of sensor scan lines connected to the plurality of sensor pixels; and
   a plurality of output lines connected to the plurality of sensor pixels,
wherein each of the plurality of sensor pixels comprise:
   a sensor electrode:
   a first transistor comprising a first gate electrode, connected to the sensor electrode;
   a second transistor comprising a second gate electrode, connected to the first transistor; and
   a first capacitor, connected to the sensor electrode, which together define a first capacitor electrode,
wherein each sensor pixel of the plurality of sensor pixels are each connected to an i-th sensor scan line of the plurality of sensor scan lines and a j-th output line of the plurality of output lines,
wherein the first transistor is directly connected to the j-th output line and controls a current output to the j-th output line,
wherein the first capacitor electrode is connected to the i-th sensor scan line, and
wherein i is an integer of 2 or greater, and j is a natural number.

2. The steering wheel of claim 1, wherein the touch information includes information on at least one of finger joint lines of the user, palm lines of the user, a fingerprint of the user, and a position of the touch.

3. The steering wheel of claim 1, wherein
the second transistor is connected between a reference voltage line and the first transistor, and
the second gate electrode is connected to the i-th sensor scan line.

4. The steering wheel of claim 3, wherein
each sensor pixel further comprises a third transistor comprising a third gate electrode is connected between the reference voltage line and the sensor electrode, and
wherein the third gate electrode is connected to an (i-1)-th scan line of the plurality of sensor scan lines.

5. The steering wheel of claim 4, wherein
each sensor pixel of the plurality of sensor pixels further comprises a second capacitor in the form of a hand of the user when the touch of the user connected be to the sensor electrode, which together define a second capacitor electrode, and
the touch sensor generates the touch information based on a capacitance change of the second capacitor corresponding to the touch.

6. The steering wheel of claim 1, wherein the cover layer further comprises a pressure sensor which generates pressure information based on a pressure change by the touch of the user.

7. The steering wheel of claim 6, wherein the cover layer further comprises a display panel which displays an image based on the touch information and the pressure information.

8. The steering wheel of claim 6, wherein the cover layer further comprises a haptic module which generates a haptic effect based on the touch information and the pressure information.

9. The steering wheel of claim 1, wherein the wheel frame comprises:
a wheel member;
a wheel hub disposed at a center of the wheel member; and
a wheel spoke connecting the wheel member with the wheel hub,
wherein the cover layer covers an outer surface of at least one of the wheel member, the wheel hub, and the wheel spoke.

10. The steering wheel of claim 9, wherein
the wheel member is a rim having a circular donut shape, and
the cover layer has flexibility.

11. A vehicle control system, comprising:
a steering wheel comprising a wheel frame and a cover layer covering the wheel frame;
an authentication controller which authenticates a user of a vehicle based on touch information and pressure information; and
a vehicle controller which controls the vehicle based on the touch information, the pressure information, and an authentication result,
wherein the cover layer comprises:
   a touch sensor which generates the touch information based on a touch of the user; and a pressure sensor which generates the pressure information based on a pressure change by the touch of the user, wherein the touch sensor comprises:
a plurality of sensor pixels which sense a capacitance change corresponding to the touch;
a plurality of sensor scan lines connected to the plurality of sensor pixels; and
a plurality of output lines connected to the plurality of sensor pixels,
wherein each of the plurality of sensor pixels comprise:
a sensor electrode:
a first transistor comprising a first gate electrode, connected to the sensor electrode;
a second transistor comprising a second gate electrode, connected to the first transistor; and
a first capacitor, connected to the sensor electrode, which together define a first capacitor electrode,
wherein each sensor pixel of the plurality of sensor pixels are each connected to an i-th sensor scan line of the plurality of sensor scan lines and a j-th output line of the plurality of output lines,
wherein the first transistor is directly connected to the j-th output line and controls a current output to the j-th output line,
wherein the first capacitor electrode is connected to the i-th sensor scan line, and
wherein i is an integer of 2 or greater, and j is a natural number.

12. The vehicle control system of claim 11, wherein the touch information includes information on at least one of finger joint lines, palm lines, a fingerprint of the user, and a position of the touch.

13. The vehicle control system of claim 11, wherein the wheel frame comprises:
a wheel member;
a wheel hub disposed at a center of the wheel member; and
a wheel spoke connecting the wheel member with the wheel hub,
wherein the cover layer covers an outer surface of at least one of the wheel member, the wheel hub, and the wheel spoke.

14. The vehicle control system of claim 11, wherein the authentication controller comprises:
an authentication processor which compares the touch information and the pressure information with a plurality of registration information, and transmits the touch information, the pressure information, matched registration information, and an approval signal to the vehicle controller when the touch information and the pressure information are matched with one of the plurality of registration information, wherein the matched registration information is the one of the plurality of registration information matched with the touch information and the pressure information;
a user information memory which stores the plurality of registration information; and
a temporary information memory which stores the touch information and the pressure information.

15. The vehicle control system of claim 14, wherein the vehicle controller controls the vehicle to start in response to the approval signal, and the vehicle controller controls the steering wheel and a shift lever to be unlocked in response to the approval signal.

16. The vehicle control system of claim 14, wherein
the vehicle controller provides the user with a pre-set user environment based on the matched registration information in response to the approval signal, and
the pre-set user environment includes at least one of a position of a wheel, orientations of a rear view mirror and a side view mirror, a position and an angle of a driver's seat, an audio channel, and an air conditioner temperature.

17. The vehicle control system of claim 14, wherein the vehicle controller controls driving of the vehicle based on the touch information and the pressure information in response to the approval signal.

18. The vehicle control system of claim 17, wherein
the vehicle controller increases a speed of the vehicle when the user grips a first area of the steering wheel at a predetermined pressure or greater, and
the vehicle controller reduces the speed of the vehicle when the user grips a second area of the steering wheel, which is spaced apart from the first area, at the predetermined pressure or greater.

19. The vehicle control system of claim 14, wherein the cover layer further comprises:
a display panel which displays an image; and
a haptic module which vibrates according to a vibration pattern.

20. The vehicle control system of claim 19, wherein
the vehicle controller comprises a memory which stores the image and the vibration pattern, and
the vehicle controller controls the display panel to display the image and the haptic module to be driven according to the vibration pattern based on the touch information and the pressure information in response to the approval signal.

* * * * *